(No Model.)
E. C. DERBY.
LATHE DOG.
No. 510,412. Patented Dec. 12, 1893.
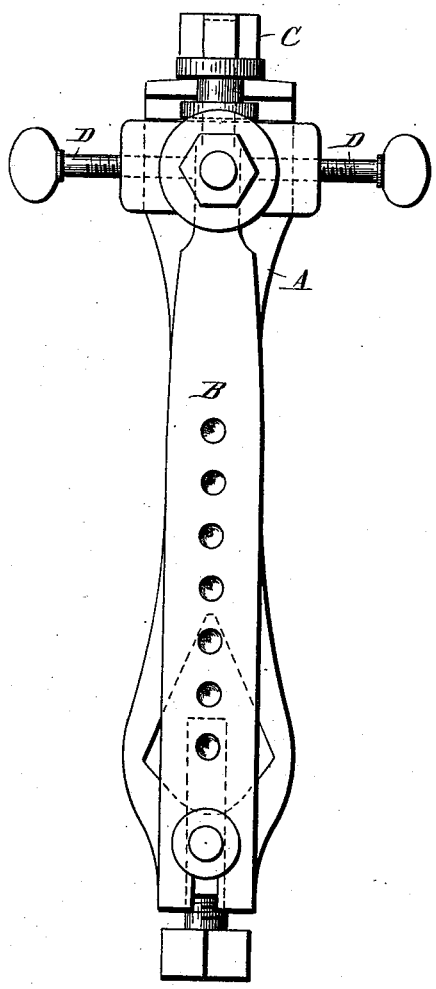
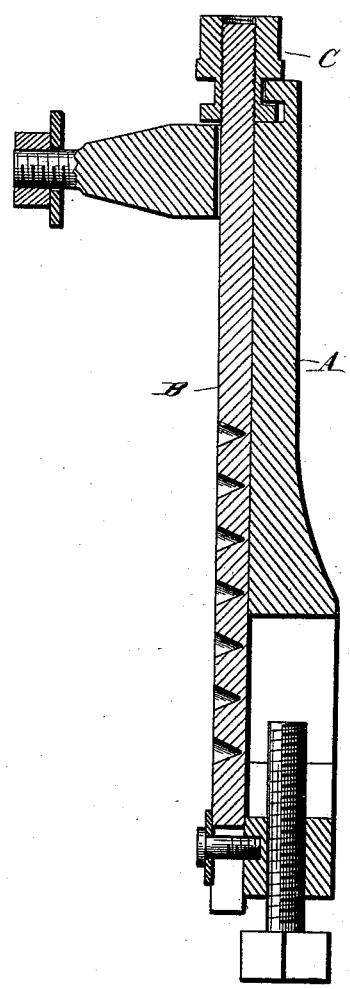
Witnesses:
H. S. Sleight
A. A. Garlock
Inventor:
Edwin C. Derby

UNITED STATES PATENT OFFICE.

EDWIN C. DERBY, OF PORTLAND, MICHIGAN.

LATHE-DOG.

SPECIFICATION forming part of Letters Patent No. 510,412, dated December 12, 1893.

Application filed February 25, 1893. Serial No. 463,760½. (No model.)

*To all whom it may concern:*

Be it known that I, EDWIN C. DERBY, a citizen of the United States, residing at Portland, in the county of Ionia and State of Michigan, have invented a new and useful Lathe-Dog, of which the following is a specification.

My invention relates to improvements in lathe dogs, and it consists in the construction and combination of the parts of the same, which will be more fully hereinafter described and pointed out.

The object of my invention is to provide a lathe dog which is simple and effective in its construction and operation, strong and durable, easily applied and adjusted and operated, positive in its workings and desired ultimate results, and cheaply manufactured.

I attain this by the construction of lathe dog, illustrated in the accompanying drawings, wherein like letters of reference indicate similar parts in both views, and in which—

Figure 1. is a plan view of my improved lathe dog. Fig. 2. is a sectional view of same.

A. indicates a clamp with aperture and set screw, for holding shaft, to which a centering bar B is secured by means of a set screw, passing through slot in lower end of centering bar, as shown; also an adjustment nut C, with collar working in groove in clamp A, as shown in upper end of dog in accompanying drawings. The thumb screws D. D are designed to make the necessary adjustment of centering bar B, holding same in position. The counter sink holes, in centering bar B. are for the center pin in face plate and tail stock of lathe, for which this appliance is designed to be used. By having the counter sink holes in centering bar B. it covers a wide range of work, as it can be used for straight or crank shafts, without drilling out the end of shaft to be turned.

Having described this my invention, I claim—

In a lathe dog the combination of a clamp A, with aperture, for holding shaft, a centering bar B. secured thereto by set screws in lower end of centering bar B, and adjustment nut C. with collar working in groove in clamp A, with thumb screws D. D. for making necessary adjustment, and holding centering bar B. in position, substantially as described.

In testimony that I claim the foregoing to be my own I have hereunto affixed my signature in presence of two witnesses.

EDWIN C. DERBY.

Witnesses:
   H. S. SLEIGHT,
   A. A. GARLOCK.